US011938864B2

(12) United States Patent
Joo

(10) Patent No.: US 11,938,864 B2
(45) Date of Patent: Mar. 26, 2024

(54) SYSTEM AND METHOD FOR CONTROLLING VEHICLE

(71) Applicants: HYUNDAI MOTOR COMPANY, Seoul (KR); Kia Corporation, Seoul (KR)

(72) Inventor: Young Sung Joo, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/682,078

(22) Filed: Feb. 28, 2022

(65) Prior Publication Data

US 2023/0035563 A1 Feb. 2, 2023

(30) Foreign Application Priority Data

Jul. 27, 2021 (KR) .................. 10-2021-0098635

(51) Int. Cl.
| | |
|---|---|
| *B60R 1/29* | (2022.01) |
| *B60R 1/27* | (2022.01) |
| *B60R 11/00* | (2006.01) |
| *B60R 11/04* | (2006.01) |
| *G02B 27/01* | (2006.01) |

(52) U.S. Cl.
CPC .............. *B60R 1/29* (2022.01); *B60R 1/27* (2022.01); *B60R 11/04* (2013.01); *G02B 27/0101* (2013.01); *G02B 27/017* (2013.01); *B60R 2011/0003* (2013.01); *B60R 2011/004* (2013.01); *B60R 2300/105* (2013.01); *B60R 2300/802* (2013.01); *B60R 2300/806* (2013.01); *G02B 2027/0138* (2013.01); *G02B 2027/014* (2013.01)

(58) Field of Classification Search
None
See application file for complete search history.

(56) References Cited

U.S. PATENT DOCUMENTS

| | | | | |
|---|---|---|---|---|
| 2010/0231715 | A1* | 9/2010 | Garner | ............... B60R 1/00 348/148 |
| 2016/0187651 | A1* | 6/2016 | Border | ............... G06F 3/011 345/8 |
| 2016/0214467 | A1* | 7/2016 | El Idrissi | ............... B60J 3/04 |
| 2017/0161950 | A1* | 6/2017 | Seder | ............... H04N 13/204 |
| 2018/0332266 | A1* | 11/2018 | Mullins | ............... H04N 13/218 |
| 2019/0317328 | A1* | 10/2019 | Bae | ............... G02B 27/0093 |
| 2020/0013225 | A1* | 1/2020 | Park | ............... B60Q 9/008 |

FOREIGN PATENT DOCUMENTS

KR 2017051978 A * 5/2017 ............... G06F 3/01

\* cited by examiner

*Primary Examiner* — Rebecca A Volentine
(74) *Attorney, Agent, or Firm* — MORGAN, LEWIS & BOCKIUS LLP

(57) ABSTRACT

Disclosed are a system and method for controlling a vehicle. The system includes a vehicle that obtains driving information and a blind spot image, and transmits the driving information and the blind spot image, and a wearable device that receives the driving information and the blind spot image from the vehicle, and outputs the blind spot image based on the driving information and gaze information of a driver.

20 Claims, 15 Drawing Sheets

| LIGHTING STEP OF VEHICLE Rheostat step | | TOLERANCE(%) Tolerance | DAYTIME MODE DUTY RATIO(%) The duty rate of daytime mode |
|---|---|---|---|
| | | | H/Wire OUTPUT |
| | | | ILL(-)_OUT- |
| 1 | | ±1.0 | 3.0 |
| 2 | | | 3.6 |
| 3 | TRANSPARENCY 1STEP | | 4.3 |
| 4 | | | 5.2 |
| 5 | | | 6.3 |
| 6 | | | 7.5 |
| 7 | | | 9.1 |
| 8 | TRANSPARENCY 2STEP | | 10.9 |
| 9 | | | 13.1 |
| 10 | | | 15.8 |
| 11 | | | 19.0 |
| 12 | (Default) | | 22.8 |
| 13 | TRANSPARENCY 3STEP | | 27.5 |
| 14 | | | 33.0 |
| 15 | | | 39.7 |
| 16 | | | 47.8 |
| 17 | | | 57.5 |
| 18 | TRANSPARENCY 4STEP | | 69.1 |
| 19 | | | 83.1 |
| 20 | | | 100 |

ADJUSTMENT SECTION: 5–6
ADJUSTMENT SECTION: 10–11
ADJUSTMENT SECTION: 15–16

Fig.11

SYSTEM AND METHOD FOR CONTROLLING VEHICLE

CROSS-REFERENCE TO RELATED APPLICATION

This application claims the benefit of priority to Korean Patent Application No. 10-2021-0098635, filed on Jul. 27, 2021 in the Korean Intellectual Property Office, the entire contents of which are incorporated herein by reference.

TECHNICAL FIELD

The present disclosure relates to a system and method for controlling a vehicle.

BACKGROUND

In general, a driver secures the driving view through the front window of a vehicle, but secures the driving view of the rear or the side rear through a rearview mirror (room mirror) or side mirror, and secures the side driving view through the window of a vehicle door. However, a blind spot is generated by the front pillar (A-pillar) provided in the middle between the front window and the side window of a vehicle and the driving view of the driver in front and side directions may be obstructed by the blind spot.

Accordingly, in order to secure the driving view in the blind spot, a scheme of installing a camera on the outside of the A-pillar to photograph the front or side front of the vehicle and displaying the captured image on the AVN screen in the vehicle has been proposed, but it is impossible to output the image to the location desired by the driver. In addition, in order to improve the driver's convenience, a scheme of mounting a monitor near the A-pillar for outputting the captured image has been proposed, but the scheme increases the material cost and thus the cost burden.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides a system and method for controlling a vehicle which are capable of outputting an image of a vehicle's blind spot at a desired position by a driver or recognizing an object located in the blind spot.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for controlling a vehicle include the vehicle that obtains driving information and a blind spot image, and transmits the driving information and the blind spot image, and a wearable device that receives the driving information and the blind spot image from the vehicle, and outputs the blind spot image based on the driving information and gaze information of a driver.

The wearable device may include one or more cameras that obtains the gaze information of the driver, an output device that outputs the blind spot image, and a controller that determines an output position of the blind spot image based on a size of a device provided in an area where the driver is required to secure a field of view.

The controller may determine the output position of the blind spot image based on a distance from a center between the one or more cameras to the device provided in the area where the driver is required to secure the field of view.

The controller may adjust a transparency of the output device based on the driving information.

The vehicle may determine a photographing location of the image according to a location of the vehicle determined based on the driving information, a steering angle, and whether a direction indicator lamp is turned on.

The wearable device may control to output an image obtained at the determined photographing location.

The vehicle may transmit location information of an object to the wearable device when the blind spot image is not obtained and it is determined that the object is detected within a specified distance from the vehicle.

The wearable device my receive the location information of the object, and output the location information in one or more forms of image, voice and vibration.

The vehicle may obtain a surrounding image of the vehicle to generate an around-view image, calculate a distance from the vehicle to a parking line based on the around-view image, and transmit the distance from the vehicle to the parking line, a location of the vehicle and the parking line to the wearable device.

The wearable device may output the location of the vehicle and the parking line, and output the distance from the vehicle to the parking line.

According to an aspect of the present disclosure, a method of controlling a vehicle includes obtaining, by the vehicle, driving information and a blind spot image, transmitting the driving information and the blind spot image to a wearable device, receiving, by the wearable device, the driving information and the blind spot image from the vehicle, and outputting the blind spot image based on the driving information and gaze information of a driver.

The outputting of the blind spot image may include obtaining the gaze information of the driver through one or more cameras provided in the wearable device, determining an output position of the blind spot image based on a size of a device provided in an area where the driver is required to secure a field of view, and outputting the blind spot image through an output device provided in the wearable device.

The determining of the output position may include determining the output position of the blind spot image based on a distance from a center between the one or more cameras to the device provided in the area where the driver is required to secure the field of view.

The outputting of the blind spot image may include adjusting a transparency of the output device based on the driving information.

The obtaining of the driving information and the blind spot image may include determining a photographing location of the image according to a location of the vehicle determined based on the driving information, a steering angle, and whether a direction indicator lamp is turned on, and obtaining the blind spot image at the determined photographing location.

The outputting of the blind spot image may include outputting an image obtained at the determined photographing location.

The method may further include determining location information of an object when the blind spot image is not obtained and the object is detected within a specified distance from the vehicle, and transmitting the location information of the object to the wearable device.

The method may further include receiving, by the wearable device, the location information of the object, and outputting the location information in one or more forms of image, voice and vibration.

The method may further include obtaining a surrounding image of the vehicle to generate an around-view image, calculating a distance from the vehicle to a parking line based on the around-view image, and transmitting the distance from the vehicle to the parking line, a location of the vehicle and the parking line to the wearable device.

The method may further include outputting, by the wearable device, the location of the vehicle and the parking line, and outputting the distance from the vehicle to the parking line.

BRIEF DESCRIPTION OF THE DRAWINGS

The above and other objects, features and advantages of the present disclosure will be more apparent from the following detailed description taken in conjunction with the accompanying drawings:

FIG. 11 is a diagram illustrating transparency adjustment of a wearable device according to an embodiment of the present disclosure;

DETAILED DESCRIPTION

Figure 1:
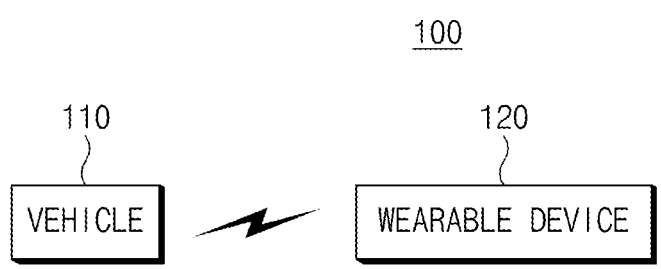
FIG. 1 is a block diagram illustrating the configuration of a system for controlling a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating the configuration of a system for controlling a vehicle according to an embodiment of the present disclosure.

As shown in FIG. 1, a system 100 for controlling a vehicle according to the present disclosure may include a vehicle 110 and a wearable device 120.

The vehicle 110 may transmit a blind spot image out of the field of view of a driver and driving information to the wearable device 120. According to an embodiment of the present disclosure, the blind spot, which is an area out of the field of view of a driver by being covered by a vehicle body, may include, for example, an area out of the field of view of a driver by an A-pillar provided between the front window and the side window of the vehicle 110. The features of the vehicle 110 will be described in detail with reference to FIG. 2.

The wearable device 120 may receive an image and driving information from the vehicle 110, and output a blind spot image based on the driving information and the gaze information of a driver. According to an embodiment of the present disclosure, the wearable device 120 may be implemented in the form of glasses that a driver can wear. The features of the wearable device 120 will be described in detail with reference to FIG. 5.

Figure 2:
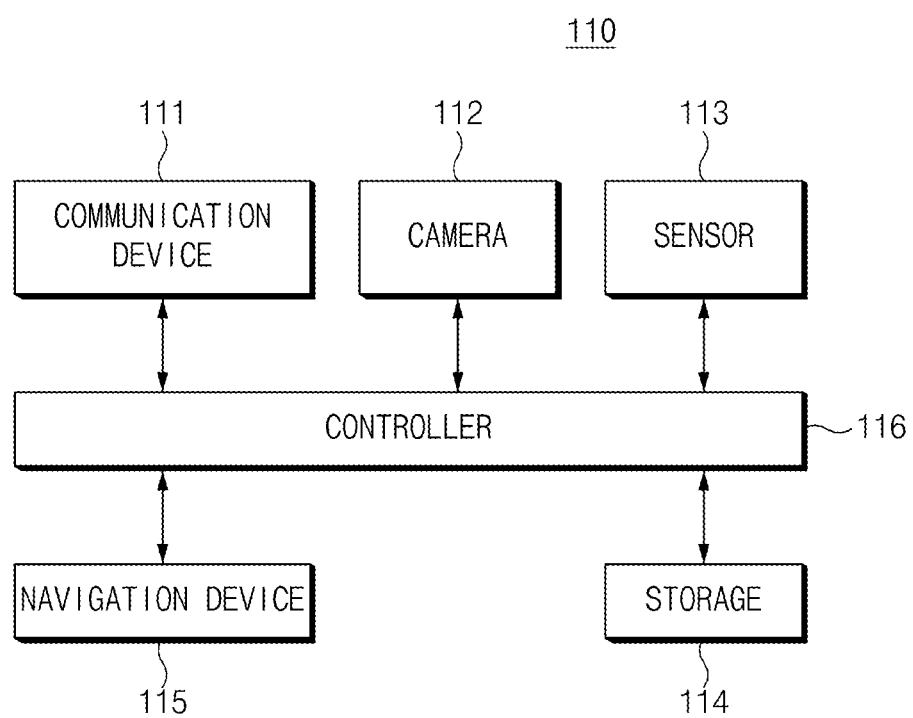
FIG. 2 is a block diagram illustrating the configuration of a vehicle according to an embodiment of the present disclosure.

FIG. 2 is a block diagram illustrating the configuration of a vehicle according to an embodiment of the present disclosure.

As shown in FIG. 2, the vehicle 110 may include a communication device 111, a camera 112, a sensor 113, storage 114, a navigation device 115, and a controller 116.

The communication device 111 may transmit an image obtained through the camera 112 and driving information to the wearable device 120. According to an embodiment, the communication device 111 may communicate with the wearable device 120 in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like. The communication device 111 may be a hardware device implemented by various electronic circuits to transmit and receive signals via, e.g., wireless connections that are listed above, but not limited thereto.

According to an embodiment of the present disclosure, the camera 112 may obtain a blind spot image by photographing the blind spot of the driver according to an embodiment of the present disclosure. To this end, the camera 112 may be provided on an outside of the A-pillar or left and right side mirrors. According to an embodiment, as the blind spot image obtained by photographing the blind sport of the driver, an image captured by a black box in a vehicle may be used.

In addition, the camera 112 may obtain a face image of a driver to obtain the gaze information of the driver. The details will be described with reference to FIG. 3.

Figure 3:
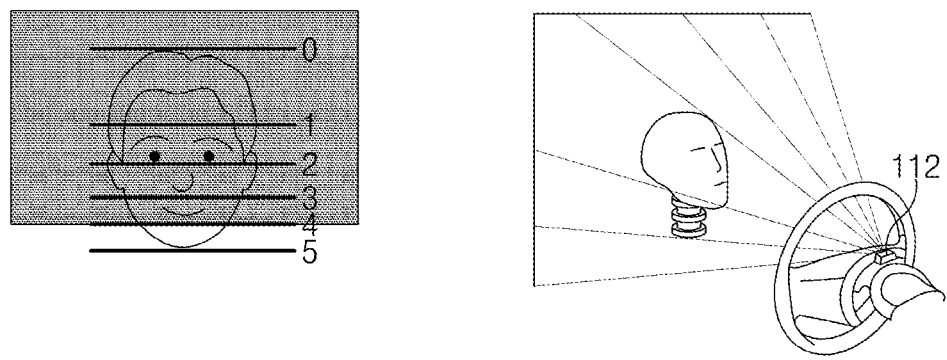
FIG. 3 is a diagram schematically illustrating a camera for determining a driver's gaze according to an embodiment of the present disclosure.

FIG. 3 is a diagram schematically illustrating a camera for determining a driver's gaze according to an embodiment of the present disclosure.

As shown in FIG. 3, the camera 112 may obtain the face image of a driver, but may be provided to obtain an area between the lips 4 and the eyebrows 1 of a driver. To this end, according to an embodiment of the present disclosure, the camera 112 is most preferably provided above a steering column upper shroud.

The camera 112 may be provided at a position to obtain the driver's face image. However, according to an embodiment of the present disclosure, because it is not easy to secure the angle of view of the camera 112 and light enters from the front, it is not preferable that the camera 112 is provided on a sun visor.

In addition, the left gaze of a driver is not easily secured and the camera 112 is not easily operated, so it is not preferable that the camera 112 is provided in a room mirror (inside mirror).

In addition, the cameras 112 may be provided at the front, rear, left and right sides of the vehicle 110, respectively, to obtain images around the vehicle 110 such as front, rear, left and right images, thereby generating an around-view image.

The sensor 113 may obtain the driving information of the vehicle 110. According to an embodiment, the sensor 113 may include a steering sensor capable of acquiring steering angle information by rotation of the steering wheel. In addition, the sensor 113 may include a heading angle sensor that obtains direction information of the vehicle 110 corresponding to the lighting of a turn indicator, a location sensor that obtains location information, and an illuminance sensor that obtains illuminance information around the vehicle 110. In addition, the sensor 113 may include a radar and a lidar that detects objects around the vehicle 110.

The storage 114 may store at least one algorithm for performing calculation or execution of various commands for the operation of the vehicle 110 according to an embodiment of the present disclosure. The storage 114 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk, but not limited thereto.

The navigation device 115 may include a GPS receiver to receive the current location of the vehicle 110, and may provide map image information of a specified area based on the current location of the vehicle 110, vehicle speed information, destination information, and the like.

The controller 116 may be implemented with various processing devices such as a processor (e.g., computer, microprocessor, CPU, ASIC, circuitry, logic circuits, etc.) in which a semiconductor chip capable of performing calculation or execution of various commands is embedded, and the like, and may control the operation of the vehicle 110 according to an embodiment of the present disclosure.

The controller 116 may determine whether a mode for outputting a blind spot image to the wearable device 120 is set. When it is determined that the mode for outputting the blind spot image to the wearable device 120 is set, the controller 116 may determine whether a route to the destination is set in the navigation device, and when it is determined that the route to the destination is set, the controller 116 may determine whether the vehicle 110 enters a specific zone. In this case, the specific zone may include a zone that requires the driver visibility into blind spots, and may include, for example, an intersection, a left-right turn section, a pedestrian protection zone, and the like.

When it is determined that the vehicle 110 enters a specific zone, the controller 116 may determine the photographing location of the blind spot image to be obtained by the camera 112 based on the steering angle determined based on the driving information and whether the direction indicator light is turned on, and may transmit the blind spot image obtained at the determined photographing location to the wearable device 120.

According to an embodiment, when the vehicle 110 operates a direction indicator light of the vehicle 110 to change the line, the camera provided in the side mirror in the direction in which the vehicle 110 intends to move for changing a line may be operated to take the blind spot image. For example, when the right direction indicator light is operated, the controller 116 may determine the photographing location as the camera provided in the right side mirror, control the camera provided in the right side mirror to obtain the blind spot image, and transmit the obtained blind spot image to the wearable device 120.

In addition, the controller 116 may determine whether the steering angle of the vehicle 110 exceeds a reference value. When the steering angle of the vehicle 110 exceeds the reference value, the controller 116 may operate the camera provided in the A-pillar in the direction in which the vehicle 110 intends to turn, control the camera to obtain a blind spot image, and transmit the obtained blind spot image to the wearable device 120.

When it is determined that the route to the destination is not set in the navigation device 115, the controller 116 may determine whether the vehicle 110 enters a pedestrian zone, whether the steering angle exceeds a reference value, and whether the direction indicator light is turned on. In addition, the controller 116 may determine the photographing location of the image based on the determination result, and control the camera 112 to obtain the blind spot image at the determined location. In addition, the controller 116 may control the blind spot image obtained by the camera 112 at the determined location to the wearable device 120.

According to an embodiment of the present disclosure, the controller 116 may obtain the blind spot image and transmits it to the wearable device 120. In addition, the controller 116 may transmit the location information of an object detected in the blind spot when the blind spot image is not obtained.

When it is determined that an object is located within a first specified distance from the vehicle 110, the controller 116 may determine that the object is detected in the blind spot, and transmit location information indicating that the object is located within the first specified distance from the vehicle 110 to the wearable device 120. In this case, the location information may include information on whether the object is located at the right or left side of the vehicle 110 as well as the distance between the object and the vehicle 110.

According to an embodiment of the present disclosure, the controller 116 may generate an around-view image by obtaining a surrounding image of the vehicle 110, and calculate a distance from the vehicle 110 to the parking line based on the around-view image. The details will be described with reference to FIG. 4.

Figure 4:
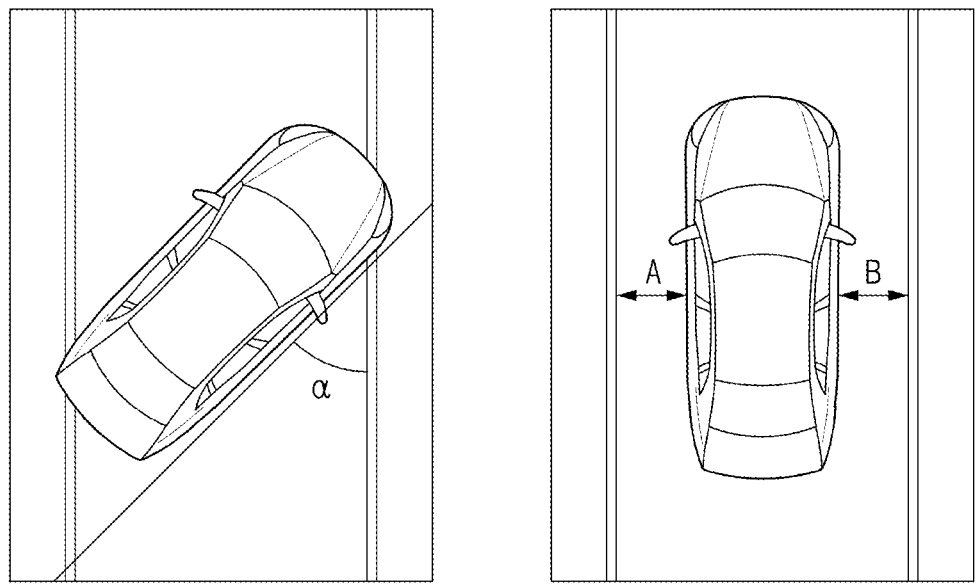
FIG. 4 is a diagram illustrating the angle and distance from a vehicle to a parking line calculated according to an embodiment of the present disclosure.

FIG. 4 is a diagram illustrating the angle and distance from a vehicle to a parking line calculated according to an embodiment of the present disclosure.

As shown in FIG. 4, the controller 116 may calculate a distance 'A' or 'B' from a driver seat handle or a passenger seat handle to a parking line. In addition, when the vehicle 110 is not parallel to the parking line, the controller 116 may calculate an angle 'α' between the outermost line of the vehicle 110 and the parking line. In addition, the controller 116 may transmit the distances 'A' and 'B' from the vehicle 110 to the parking lines to the wearable device 120, or transmit the angle 'α' between the vehicle 110 and the parking line to the wearable device 120.

Figure 5:
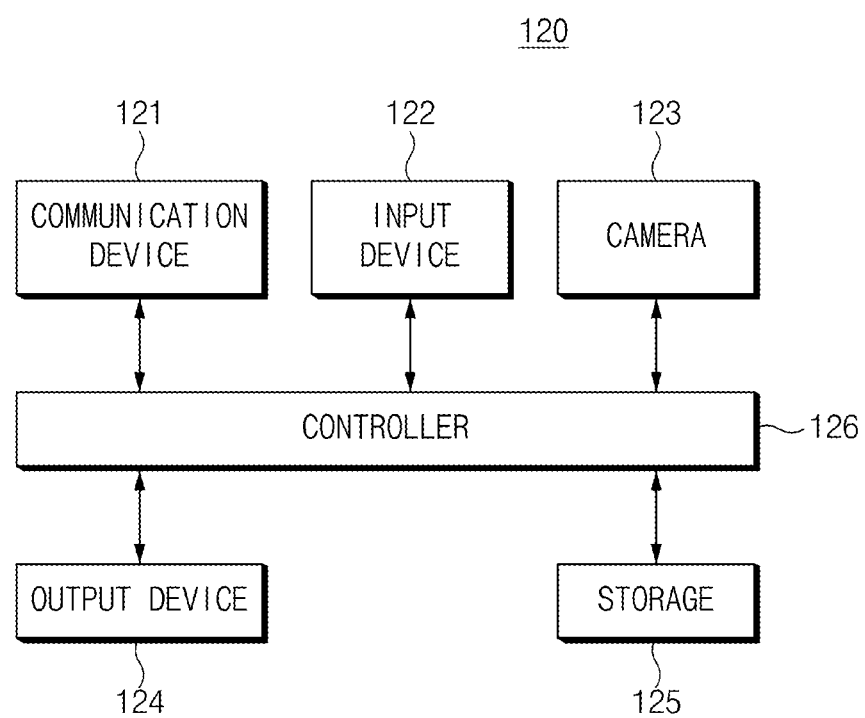
FIG. 5 is a block diagram illustrating the configuration of a wearable device according to an embodiment of the present disclosure.

FIG. 5 is a block diagram illustrating the configuration of a wearable device according to an embodiment of the present disclosure.

As shown in FIG. 5, the wearable device 120 may include a communication device 121, an input device 122, a camera 123, an output device 124, storage 125, and a controller 126.

The communication device 121 may receive the blind spot image and the driving information obtained by the vehicle 110. According to an embodiment, the communication device 121 may communicate with the vehicle 110 in various wireless communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like. The communication device 121 may be a hardware device implemented by various electronic circuits to transmit and receive signals via, e.g., wireless connections that are listed above, but not limited thereto.

The input device 122 may receive an input signal corresponding to the manipulation, motion, or voice of the driver and the controller 126 may activate at least one function in response to the input signal. According to an embodiment, the input device 122 may be implemented as a button, a touch pad, or the like which may be manipulated by a driver or a passenger or at least one of a motion sensor and a voice recognition sensor that detect a motion (gesture) and voice of a passenger, or a combination thereof. The details will be described with reference to FIGS. 6A and 6B.

Figure 6A:
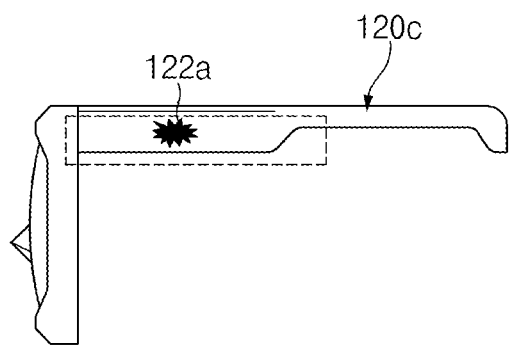
FIGS. 6A and 6B are diagrams illustrating an input device of a wearable device according to an embodiment of the present disclosure.
Figure 6B:
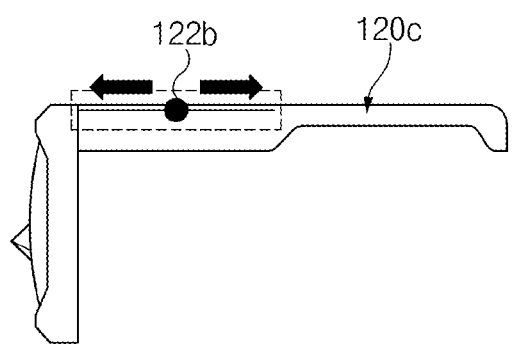

FIGS. 6A and 6B are diagrams illustrating an input device of a wearable device according to an embodiment of the present disclosure.

According to an embodiment of the present disclosure, the input device 122 may be provided on left and right leg portions 120c of glasses, and the input device 122 may include a click mode input device 122a that sense a touch click of a driver as shown in FIG. 6A and a slide mode input unit 122b that senses a touch slide of the driver as shown in FIG. 6B, which are provided separately.

Figure 7:
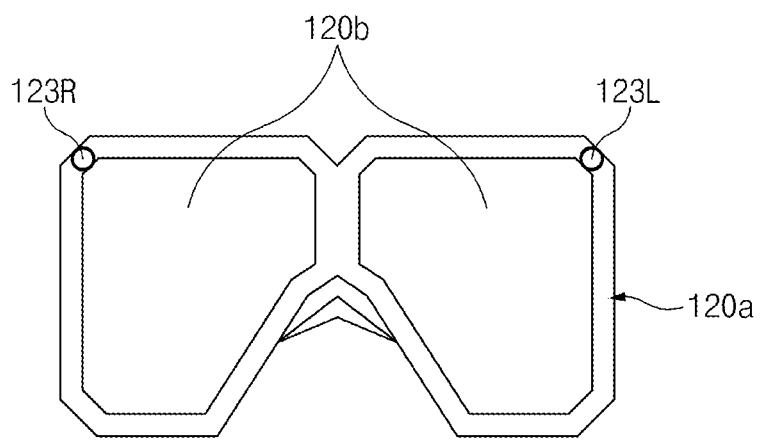
FIG. 7 is a diagram schematically illustrating a camera and an output device provided in a wearable device according to an embodiment of the present disclosure.

The camera 123 may obtain the gaze information of the driver. In detail, the features of the camera 123 will be described with reference to FIG. 7. FIG. 7 is a diagram schematically illustrating a camera and an output device provided in a wearable device according to an embodiment of the present disclosure. According to an embodiment, as shown in FIG. 7, the camera 123 may include a first camera 123L provided on the left upper end of an eyeglass frame 120a and a second camera 123R provided on the right upper end of the eyeglass frame 120a based on the wearing of the driver.

The output device 124 may output the blind spot image received from the vehicle 110. To this end, as shown in FIG. 7, the output device 124 may be provided in a lens portion 120b of the glasses. In addition, according to an embodiment of the present disclosure, the output device 124 may output location information of an object around the vehicle 110 received from the vehicle 110. In this case, the location information of an object may be output through the lens portion by a separate identification mark (image), but is not limited thereto. Although not shown, the location information may be output through a speaker or a vibration output device provided in the left and right leg positions (120c of FIGS. 6A and 6B) of the eyeglass frame 120a. Accordingly, the output device 124 according to an embodiment of the present disclosure may include the lens portion 120b of the glasses, a speaker, and a vibration output device, but not limited thereto.

According to an embodiment of the present disclosure, the lens portion 120b may include a film including a polymer dispersed liquid crystal layer (PDLL).

The storage 125 may store at least one algorithm for performing operations or execution of various commands for the operation of a wearable device according to an embodiment of the present disclosure. The storage 125 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk, but not limited thereto.

The controller 126 may be implemented with various processing devices such as a processor (e.g., computer, microprocessor, CPU, ASIC, circuitry, logic circuits, etc.) in which a semiconductor chip capable of performing calculation or execution of various commands is embedded, and the like, and may control the operation of the wearable device 120 according to an embodiment of the present disclosure.

The controller 126 may change the operation mode according to the touch of the input device 122. According to an embodiment, the controller 126 may change the operation mode when the input device 122 is touched for a specified time or longer. According to an embodiment of the present disclosure, the operation mode may include an image output mode, an audio output mode, a vibration output mode, a call mode, and the like.

The controller 126 may receive the route information to the destination set in the navigation device (115 of FIG. 1), and may control to output the information through the output device 124. In addition, the controller 126 may receive the blind spot image obtained by the vehicle 110, and output the blind spot image received from the vehicle 110 through the output device 124. When the blind spot image is not obtained from the vehicle 110, the controller 126 may receive the location information of an object around the vehicle 110 and control to output the location information through the output device 124 in one or more forms of image, sound and vibration. In addition, the controller 126 may activate a call mode to execute a call function.

According to an embodiment of the present disclosure, when the click mode input device (122a in FIG. 6A) is input in a state in which the image output mode is activated, the controller 126 may control the function of the image output mode based on the number of times it is input. When the click mode input device 122 is input once, the controller 126 may control the turn on/off of the image output mode, and when inputted twice, the controller 126 may control to change the images output to the left and right lens portions, respectively.

In addition, the controller 126 may control to start a call when the click mode input device (122a in FIG. 6A) is inputted once while the call mode is activated, and to end the call when inputted twice. In addition, the controller 126 may increase or decrease the call volume when the slide mode input device (122b of FIG. 6B) is operated while the call mode is activated.

The controller 126 may output the image received from the vehicle 110 through the output device 124, but when recognizing a marker provided in at least one location preset by the driver, may output the image in the space corresponding to the location of the marker. The details will be described with reference to FIG. 8.

Figure 8:
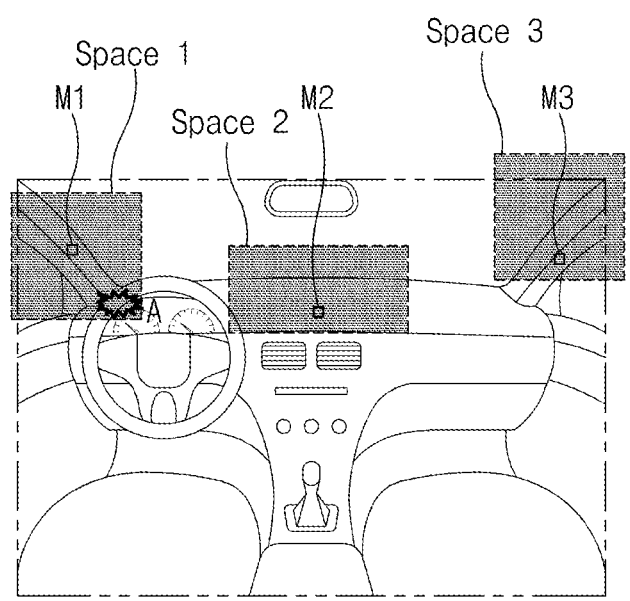
FIG. 8 is a diagram illustrating the location of a marker according to an embodiment of the present disclosure.

FIG. 8 is a diagram illustrating the location of a marker according to an embodiment of the present disclosure.

As shown in FIG. 8, according to an embodiment of the present disclosure, a first marker M1 may be located on the left A-pillar of the vehicle 110, a second marker M2 may be located on the navigation device of the vehicle 110, and a third marker M3 may be located on the right A-pillar of the vehicle 110.

When the camera 123 recognizes one of the markers provided at least one preset location in the vehicle 110 corresponding to the driver's gaze, the controller 126 may output an image into a space corresponding to the location of the recognized marker.

For example, when the camera 123 recognizes the first marker M1 of FIG. 8, the controller 126 may output the image (image received from the vehicle 110) into a first space (space 1) corresponding to the location of the first marker M1. In the same manner, when the camera 123 recognizes the second marker M2, the controller 126 may output the image (image received from the vehicle 110) into a second space (space 2) corresponding to the location of the second marker M2. When the camera 123 recognizes the third marker M3, the controller 126 may control to output the image (image received from the vehicle 110) into a third space (space 3) corresponding to the location of the third marker M3. When the second space and the third space into which the image is output in the driver's gaze direction are overlapped, the controller 126 may determine to fix the location of a space having high priority according to the priority of the space set by the driver and determine to move the location of a remaining space.

When an image is output into a space corresponding to the location of the recognized marker and a device (e.g., a cluster) provided in an area where the field of view of the driver must be secured is obscured by the image as shown in 'A' of FIG. 8, because it violates the law, the controller 126 may determine the location of the space (the location where the image is output) so that the device is not covered.

According to an embodiment of the present disclosure, the controller 126 may determine the location at which an image is output based on the distance from the camera 123 to the cluster and the size of the cluster. The details will be described with reference to FIG. 9.

Figure 9:
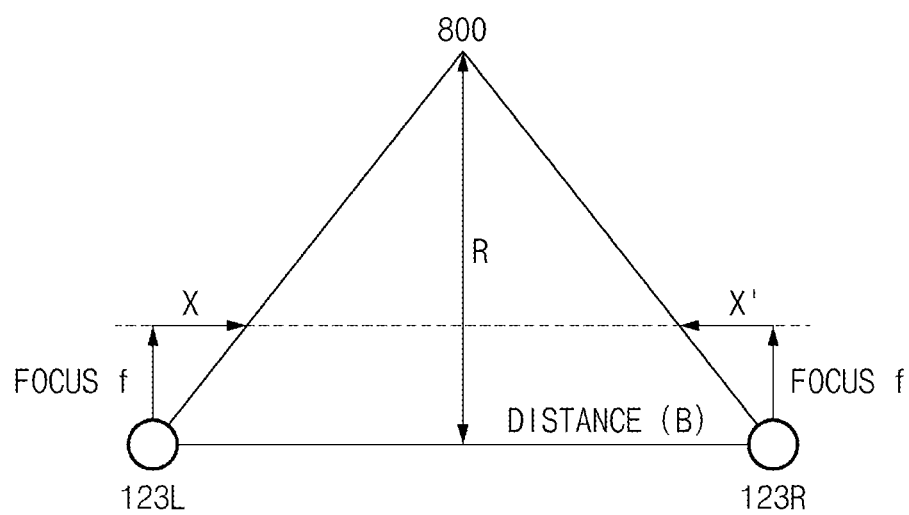
FIG. 9 is a diagram illustrating a distance from a wearable device to a device according to an embodiment of the present disclosure.

FIG. 9 is a diagram illustrating a distance from a wearable device to a device according to an embodiment of the present disclosure.

As shown in FIG. 9, the controller 126 may calculate a distance 'B' between the first camera 123L and the second camera 123R. In addition, the controller 126 may calculate 'x' and 'x' based on a point at which straight lines connecting the first camera 123L and the second camera 123R to a device 800 are met with a straight lines at the focal lengths f of the first camera 123L and the second camera 123R. The controller 126 may calculate a distance 'R' from the center between the first and second cameras 123L and 123R to the device 800 based on Equation 1 using 'x', 'x', 'B' and 'f' calculated in the above-described manner.

$$x-x'=B*f/R \qquad \text{[Equation 1]}$$

The controller 126 may determine a location at which an image is output based on the distance 'R' calculated by Equation 1 and the size of the device.

When an image is output into a space corresponding to the location of the recognized marker and a device (e.g., a cluster) provided in an area where the field of view of the driver must be secured is obscured by the image as shown in 'A' of FIG. 8, the controller 126 may adjust the transparency of the image to prevent the device from being obscured by the image.

When the blind spot image is not received from the vehicle 110, the controller 126 may control the location information of an object detected in a blind spot received from the vehicle 110 to be output in one or more forms of image, voice and vibration. The details of the image of the blind spot or the location information of the object received from the vehicle 110 will be described with reference to FIG. 10.

Figure 10:
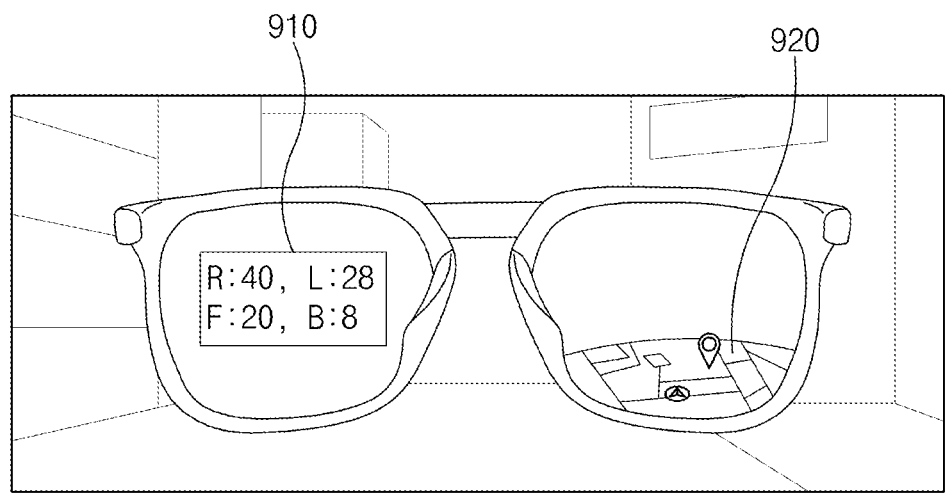
FIG. 10 is a diagram schematically illustrating an output manner of a wearable device according to an embodiment of the present disclosure.

FIG. 10 is a diagram schematically illustrating an output manner of a wearable device according to an embodiment of the present disclosure.

As shown in FIG. 10, the controller 126 may output distance information 910 of a device (e.g., a cluster), which is provided in an area where the field of view of the driver must be secured through an output device (lens portion), and an image 920 of the location information of an object. Although not shown, the controller 126 may output the location information of the object in one or more forms of voice and vibration together with the image 920 of FIG. 10.

The controller 126 may adjust the transparency of the output device (lens device) based on the driving information received from the vehicle 110. When the illuminance value of the vehicle 110 exceeds a threshold value, the controller 126 may control the lens device to be opaque by adjusting the transparency and function as sunglasses. According to an embodiment of the present disclosure, the lens device may include a polymer dispersed liquid crystal layer (PDLC), and the polymer dispersed liquid crystal layer may change liquid crystal transmittance corresponding to an applied voltage. Accordingly, the controller 126 may adjust the transparency by applying a voltage to the lens device by using the features of the polymer dispersed liquid crystal layer. The details will be described with reference to FIG. 11.

FIG. 11 is a diagram illustrating transparency adjustment of a wearable device according to an embodiment of the present disclosure.

As shown in FIG. 11, the controller 126 may adjust the transparency of the lens device based on driving information (illuminance information) received from the vehicle 110. According to an embodiment, the controller 126 may divide the transparency into 4 steps by bundling the lighting steps (1~20) of the vehicle 110 set corresponding to the illumination information of the vehicle 110 by specified steps (e.g., 5 steps), and adjust the transparency. In addition, the controller 126 may prevent the transparency from being frequently changed between steps of transparency by providing an adjustment section for transparency. For example, when the illumination value of the vehicle 110 is changed and the lighting step of the vehicle 110 is changed from step 5 to step 6, the transparency of the lens device is not changed from step 1 to step 2, but when the lighting step of the vehicle 110 is changed to step 7, so that the transparency of the lens device is changed from step 1 to step 2. As a result, the controller 126 may prevent transparency from being frequently changed, thereby reducing the driver's eye fatigue.

In addition, the controller 126 may store the transparency according to the driver's preference in addition to the above-described scheme controlling the transparency of the lens device, and may adjust the transparency of the lens device according to the driver's preference.

The controller 126 may receive, from the vehicle 110, the distance to the parking line calculated based on the around-view image generated from the vehicle 110, and the angle between the vehicle 110 and the parking line, and may output the distance and angle through the output device (lens device). The details will be described with reference to FIG. 12.

Figure 12:
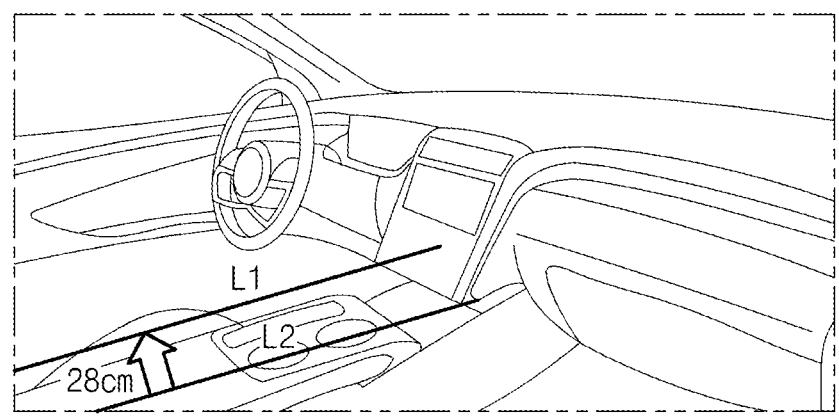
FIG. 12 is a diagram illustrating a parking line and a location of a vehicle output through a wearable device according to an embodiment of the present disclosure.

FIG. 12 is a diagram illustrating a parking line and a location of a vehicle output through a wearable device according to an embodiment of the present disclosure.

As shown in FIG. 12, when the distance between the vehicle 110 and the parking line is received from the vehicle 110, the controller 126 may output the line (vehicle line) L1 on which the vehicle 110 is located and the parking line L2 in different colors such that the driver can intuitively recognize them. According to the embodiment, when the driver looks to the right while the wearable device is mounted, the controller 126 may output the vehicle line L1 in red and the parking line L2 in white, such that the driver may intuitively recognize them. In addition, the controller 126 may output the distance between the vehicle line L1 and the parking line L2 together.

Figure 13:
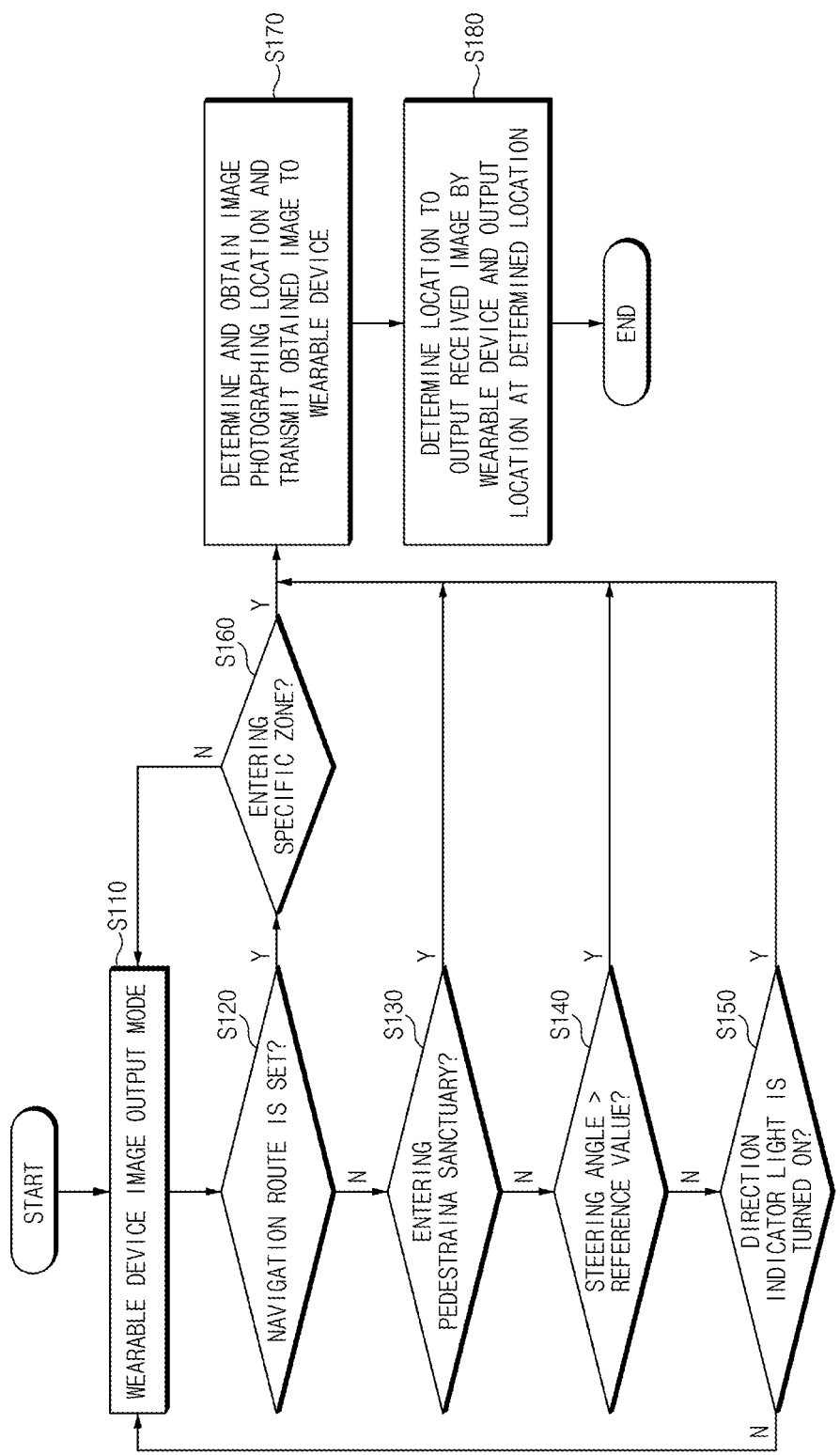
FIG. 13 is a flowchart illustrating a method of controlling a vehicle according to an embodiment of the present disclosure.

FIG. 13 is a flowchart illustrating a method of controlling a vehicle according to an embodiment of the present disclosure.

As shown in FIG. 13, the vehicle 110 may determine whether the wearable device 120 is set into the image output mode. When the wearable device 120 is set into the image output mode in S110, the vehicle 110 may determine whether a route to the destination is set in the navigation device in S120.

When it is determined in S120 that the route to the destination is set in the navigation device (Y), the vehicle 110 may determine whether the vehicle 110 enters a specific zone in S160. In S160, the specific zone may include a zone in which the driver's view of the blind spot is required, and may include, for example, an intersection, left and right turning sections, a pedestrian protection zone, and the like.

When it is determined in S160 that the vehicle 110 enters the specific zone (Y), in S170, the vehicle 110 may determine and obtain the photographing location of the blind spot image to be obtained by the camera 112 based on the steering angle determined based on the driving information and whether the direction indicator light is turned on, and may transmit the blind spot image obtained at the determined photographing location to the wearable device 120.

According to an embodiment, in S170, when the vehicle 110 operates a direction indicator light of the vehicle 110 to change the line, the camera provided in the side mirror in the direction in which the vehicle 110 intends to move for changing a line may be controlled to take the blind spot image. For example, when the right direction indicator light is operated, the vehicle 110 may determine the photographing location as the camera provided in the right side mirror, control the camera provided in the right side mirror to obtain the blind spot image, and transmit the obtained blind spot image to the wearable device 120.

In addition, in S170, the vehicle 110 may determine whether the steering angle of the vehicle 110 exceeds a reference value. When the steering angle of the vehicle 110 exceeds the reference value, the vehicle 110 may operate the camera provided in the A-pillar in the direction in which the vehicle 110 intends to turn, control the camera to obtain a blind spot image, and transmit the obtained blind spot image to the wearable device 120.

When the wearable device 120 receives the blind spot image from the vehicle 110, in S180, the wearable device 120 may determine a location to output the received image based on the driver's gaze information, and control to output the image to the determined location. In S180, the wearable device 120 may control the output of the image received from the vehicle 110 in the manner described with reference to FIGS. 8 to 12.

When it is determined in S120 that the route to the destination is not set in the navigation device (N), in S170, the vehicle 110 may determine whether the vehicle 110 enters a pedestrian zone, whether the steering angle exceeds a reference value, and whether the direction indicator light is turned on. In addition, the controller 116 may determine the photographing location of the image based on the determination result, and control the camera 112 to obtain the blind spot image at the determined location. In addition, the vehicle 110 may control to transmit the blind spot image obtained by the camera 112 at the determined location to the wearable device 120.

In S170, the vehicle 110 may transmit the location information of the object detected in the blind spot when the blind spot image is not obtained. The details will be described with reference to FIG. 14.

Figure 14:
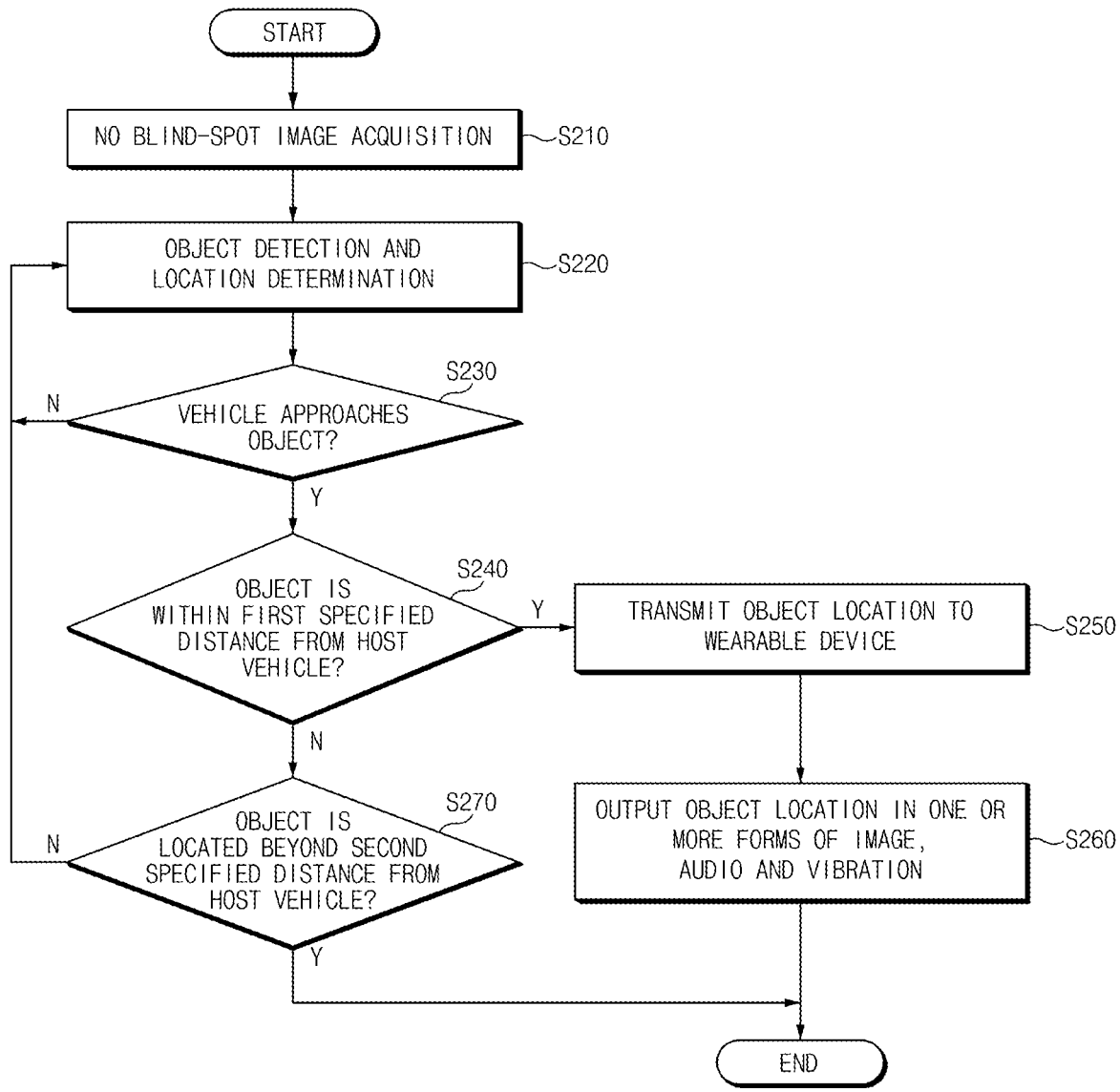
FIG. 14 is a flowchart illustrating a method of controlling a vehicle according to another embodiment of the present disclosure.

FIG. 14 is a flowchart illustrating a method of controlling a vehicle according to another embodiment of the present disclosure.

As shown in FIG. 14, when it is determined in S210 that the blind spot image is not obtained, in S220, the vehicle 110 may detect an object around the vehicle and determine the location of the object.

In S230, the vehicle 110 may determine whether the detected object approaches the vehicle. When it is determined that the detected object approaches the vehicle (Y), in S240, the vehicle 110 may determine whether the object is located within a first specified distance from the vehicle.

When it is determined in S240 that the object is located within the first specified distance from the vehicle (Y), in S250, the vehicle 110 may determine that the object is located in the blind spot, and transmit the location information of the object to the wearable device.

When the wearable device 120 receives the location information of the object from the vehicle 110, in S260, the wearable device 120 may output the location of the object in one or more forms of image, voice and vibration.

When it is determined in S240 that the object is not located within the first specified distance from the vehicle (N), in S270, the vehicle 110 may determine whether the object is located beyond a second specified distance from the host vehicle. In this case, the first specified distance may have a value less than the second specified distance.

When it is determined in S270 that the object is located beyond the second specified distance from the vehicle (Y), the vehicle may terminate the operation. When it is determined in S270 that the object is not located beyond the second specified distance from the vehicle, the vehicle may perform S220.

Figure 15:
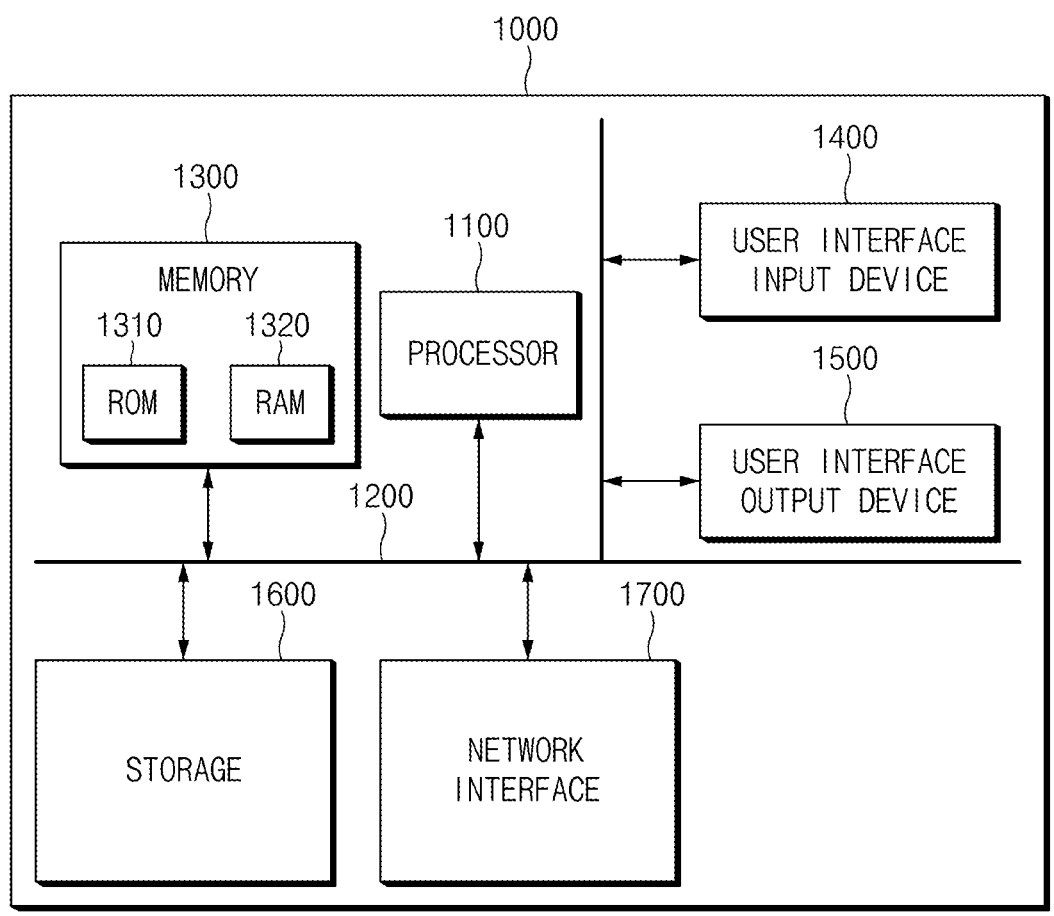
FIG. 15 is a block diagram illustrating a computing system for executing a method according to an embodiment of the present disclosure.

FIG. 15 is a block diagram illustrating a computing system for executing a method according to an embodiment of the present disclosure.

Referring to FIG. 15, a computing system 1000 may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The system and method for controlling a vehicle according to an embodiment of the present disclosure may improve the user's convenience by outputting an image of the vehicle's blind spot at a location desired by a driver, and may allow the driver to recognize an object located in the blind spot, thereby contributing to safe driving.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A system for controlling a vehicle, the system comprising:
    the vehicle configured to obtain driving information and a blind spot image, and transmit the driving information and the blind spot image; and
    a wearable device configured to receive the driving information and the blind spot image from the vehicle, and output the blind spot image based on the driving information and gaze information of a driver,
    wherein the wearable device outputs the blind spot image such that a device provided in an area where the driver is required to secure a field of view is not blocked by the blind spot image, and
    wherein, when the wearable device recognizes a marker provided in at least one location preset by the driver, the wearable device outputs the blind spot image in a space corresponding to the at least one location of the recognized marker.

2. The system of claim 1, wherein the wearable device includes:
    one or more cameras configured to obtain the gaze information of the driver;
    an output device configured to output the blind spot image; and
    a controller configured to determine an output position of the blind spot image based on a size of the device provided in the area where the driver is required to secure the field of view.

3. The system of claim 2, wherein the controller is configured to determine the output position of the blind spot image based on a distance from a center between the one or more cameras to the device provided in the area where the driver is required to secure the field of view.

4. The system of claim 2, wherein the controller is configured to adjust a transparency of the output device based on the driving information.

5. The system of claim 1, wherein the vehicle is configured to determine a photographing location of the image according to a location of the vehicle determined based on the driving information, a steering angle, and whether a direction indicator lamp is turned on.

6. The system of claim 5, wherein the wearable device is configured to control to output an image obtained at the determined photographing location.

7. The system of claim 1, wherein the vehicle is configured to transmit location information of an object to the wearable device when the blind spot image is not obtained and it is determined that the object is detected within a specified distance from the vehicle.

8. The system of claim 7, wherein the wearable device is configured to receive the location information of the object, and output the location information in one or more forms of image, voice and vibration.

9. The system of claim 1, wherein the vehicle is configured to obtain a surrounding image of the vehicle to generate an around-view image, calculate a distance from the vehicle to a parking line based on the around-view image, and transmit the distance from the vehicle to the parking line, a location of the vehicle and the parking line to the wearable device.

10. The system of claim 9, wherein the wearable device is configured to output the location of the vehicle and the parking line, and output the distance from the vehicle to the parking line.

11. A method for controlling a vehicle, the method comprising:
   obtaining, by the vehicle, driving information and a blind spot image;
   transmitting, by the vehicle, the driving information and the blind spot image to a wearable device;
   receiving, by the wearable device, the driving information and the blind spot image from the vehicle; and
   outputting, by the wearable device, the blind spot image based on the driving information and gaze information of a driver,
   wherein the outputting of the blind spot image includes outputting the blind spot image such that a device provided in an area where the driver is required to secure a field of view is not blocked by the blind spot image, and
   wherein, when the wearable device recognizes a marker provided in at least one location preset by the driver, the wearable device outputs the blind spot image in a space corresponding to the at least one location of the recognized marker.

12. The method of claim 11, wherein the outputting of the blind spot image includes:
   obtaining the gaze information of the driver through one or more cameras provided in the wearable device;
   determining an output position of the blind spot image based on a size of the device provided in the area where the driver is required to secure the field of view; and
   outputting the blind spot image through an output device provided in the wearable device.

13. The method of claim 12, wherein the determining of the output position includes:
   determining the output position of the blind spot image based on a distance from a center between the one or more cameras to the device provided in the area where the driver is required to secure the field of view.

14. The method of claim 12, wherein the outputting of the blind spot image includes:
   adjusting a transparency of the output device based on the driving information.

15. The method of claim 11, wherein the obtaining of the driving information and the blind spot image includes:
   determining a photographing location of the image according to a location of the vehicle determined based on the driving information, a steering angle, and whether a direction indicator lamp is turned on; and
   obtaining the blind spot image at the determined photographing location.

16. The method of claim 15, wherein the outputting of the blind spot image includes:
   outputting an image obtained at the determined photographing location.

17. The method of claim 11, further comprising:
   determining location information of an object when the blind spot image is not obtained and the object is detected within a specified distance from the vehicle; and
   transmitting the location information of the object to the wearable device.

18. The method of claim 17, further comprising:
   receiving, by the wearable device, the location information of the object, and outputting, by the wearable device, the location information in one or more forms of image, voice and vibration.

19. The method of claim 11, further comprising:
   obtaining, by the vehicle, a surrounding image of the vehicle to generate an around-view image;
   calculating, by the vehicle, a distance from the vehicle to a parking line based on the around-view image; and
   transmitting, by the vehicle, the distance from the vehicle to the parking line, a location of the vehicle and the parking line to the wearable device.

20. The method of claim 19, further comprising:
   outputting, by the wearable device, the location of the vehicle and the parking line, and outputting the distance from the vehicle to the parking line.

* * * * *